Figure 1:
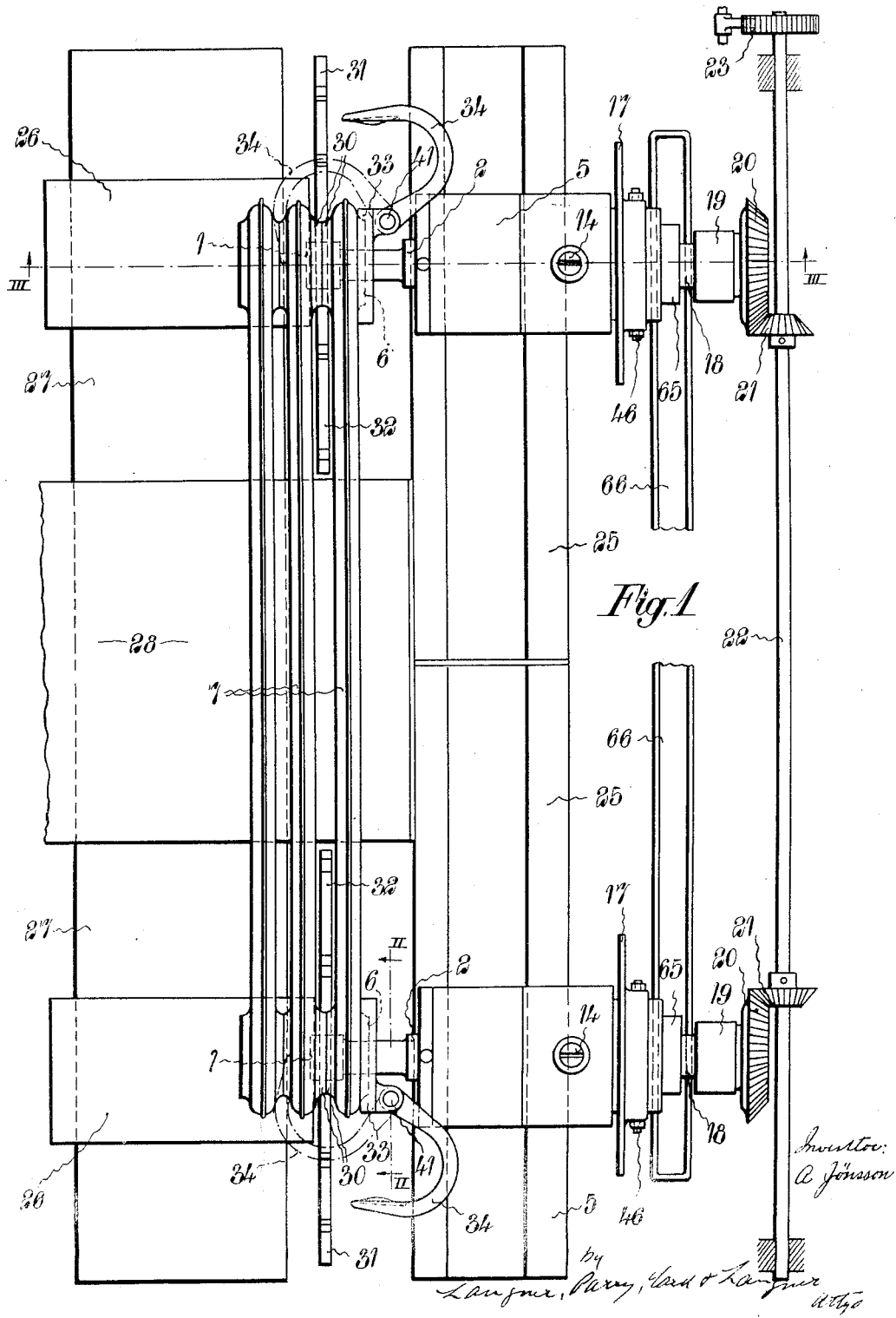

March 20, 1928.

A. JÖNSSON 1,663,200

RESISTANCE WELDING MACHINE

Filed Nov. 10, 1926

3 Sheets-Sheet 1

March 20, 1928. 1,663,200
A. JÖNSSON
RESISTANCE WELDING MACHINE
Filed Nov. 10, 1926   3 Sheets-Sheet 2
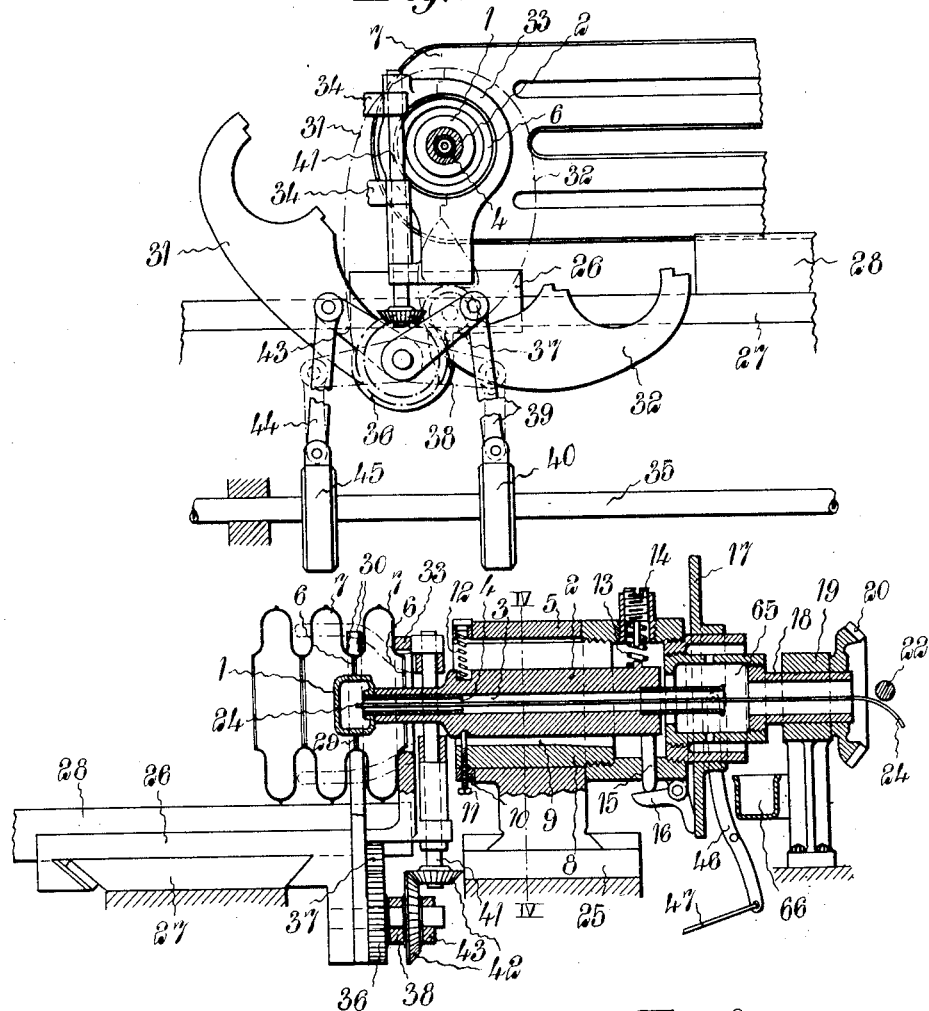
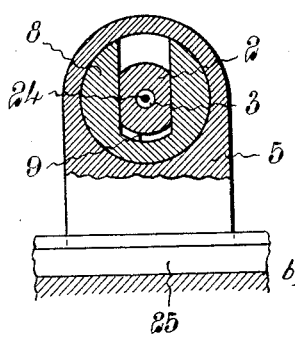
INVENTOR
A. Jönsson

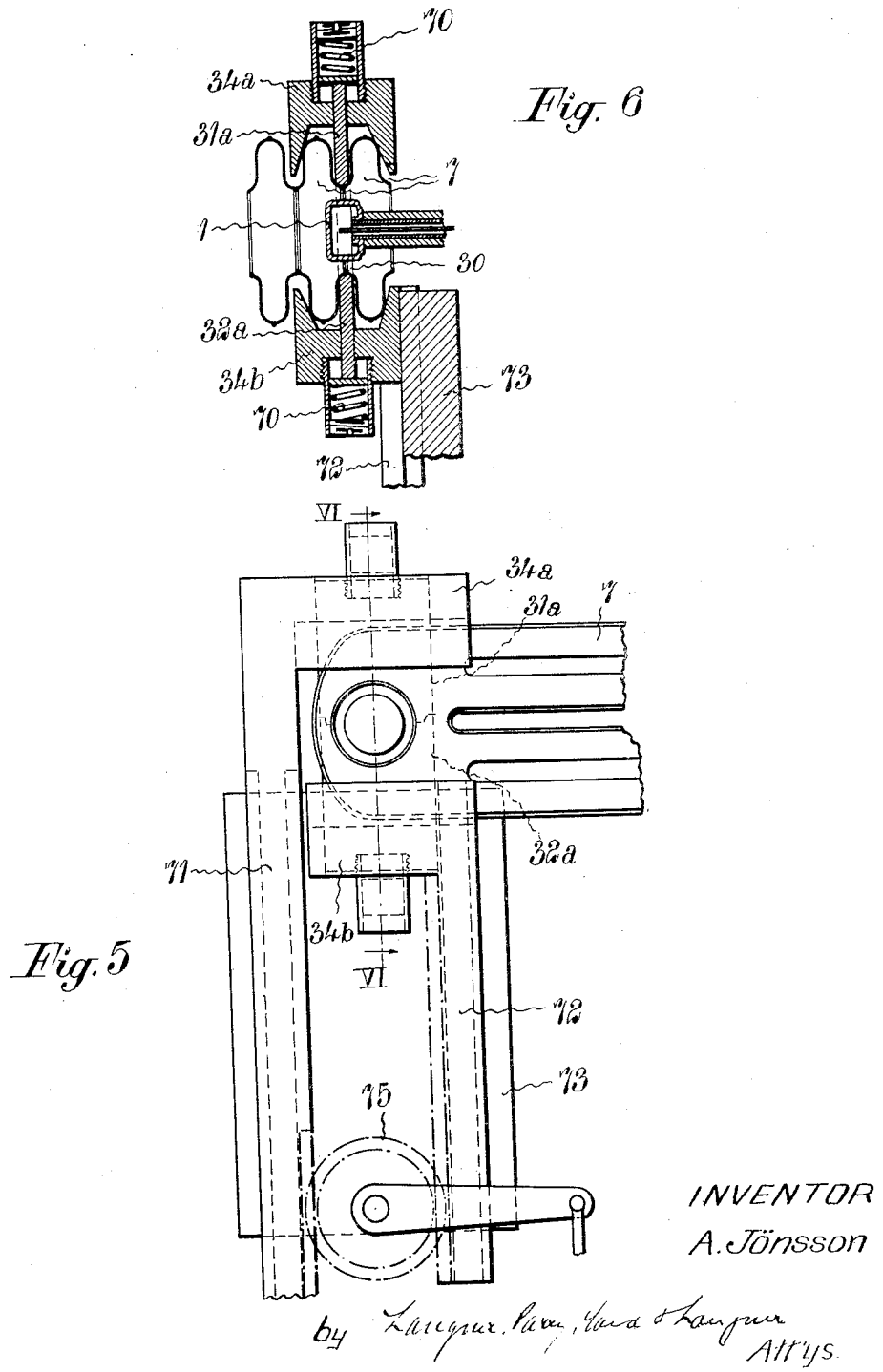

Patented Mar. 20, 1928.

1,663,200

UNITED STATES PATENT OFFICE.

ANDERS JÖNSSON, OF HELSINGBORG, SWEDEN.

RESISTANCE WELDING MACHINE.

Application filed November 10, 1926, Serial No. 147,556, and in Sweden October 19, 1925.

The radiators for heating installations are in the present day made to a great extent of sheet metal instead of as previously of cast iron, and such radiators are usually composed of sections having connection openings surrounded by flanges by means of which the sections are joined together by welding. Hitherto such welding of the sections has been carried out by means of welding burners.

The object of the present invention is to provide a considerably quicker and cheaper method of welding the sections together. In addition, this new method includes the advantage that the welded seam becomes more even and has a better appearance externally than has hitherto been achieved by the older methods, so that any finishing or cleaning of the welded seam will not be required.

According to the present invention the welding is carried out electrically by means of electrodes which are positioned in place internally of the connection openings of the sections and which work upon the edges of the adjacent and abutting flanges to be joined, the welding of the said joints at both ends of the radiator sections being preferably carried out in a machine having a double set of electrodes.

The invention is illustrated in the accompanying drawings, in which: Figure 1 shows one form of embodiment of a machine for carrying out the method according to the invention. Fig. 2 shows a section on the line II—II in Fig. 1 and seen in the direction of the arrows. Fig. 3 shows a section on the line III—III in Fig. 1 and seen in the direction of the arrows. Fig. 4 shows a section on the line IV—IV in Fig. 3. Fig. 5 shows a front elevation and Fig. 6 shows a vertical section of a modified clamping device for the sections.

The machine as illustrated is adapted to simultaneously weld the flanges at both ends of the radiator sections and for this purpose it is provided with a double set of electrodes. Each electrode to be used for welding the said flanges internally is preferably constituted by a hollow roller 1 which is fixed to the front end of a hollow mandrel 4 which is rotatably inserted in the bore-hole 3 of a hollow spindle 2, as clearly illustrated in Fig. 3. The spindle 2 is supported by a bearing or housing 5 and its front end of reduced diameter projects from said housing and is intended together with the electrode 1 thereon to be inserted through the connection openings 6 of the radiator sections 7 to be joined together. In the housing 5 is journalled a sleeve or hollow shaft 8 having a longitudinal groove like cavity 9 in which the spindle 2 being provided with flat surfaces on two opposite sides is inserted so that it is rotatable together with the sleeve 8 and may be positioned in co-axial or eccentric relation to the latter. The front end of the sleeve 8, projecting from the bearing or housing 5 has a stop ring 10, and in a threaded hole through the stop ring and the projecting end of the sleeve 8 is inserted a set screw 11 which forms with its inner end a radial support for the spindle 2, about which the latter may be rocked within certain limits. Diametrically opposite the said set screw 11 there is inserted in the stop ring 10 a helical spring 12 adapted to press the spindle towards the point of the screw 11. On the same side as the spring 12 but at the back end of the spindle 2 there is another spring 13 acting on the spindle 2. This spring 13 is relatively powerful and its tension should be adjustable, for instance as shown, by means of an adjusting screw 14 or the like. Diametrically opposite the said spring 13 the spindle 2 rests upon a pin 15 radially movable in a hole through the wall of a sleeve and abutting with its free end a bell crank lever 16 of which its other arm rests against a disc 17 which is axially reciprocable. When this disc has the position as shown in Fig. 3, the spindle 2 together with the electrode 1 thereon is centered in relation to the housing 5 and also in relation to the connection openings in the radiator sections 7. When however the disc 17 is moved backwardly (to the right in the illustration) the pin 15 may move outwardly, so that the spindle 2 will be rocked through the influence of the spring 13 about the point of the set screw 11 and thus receive an inclined position in which the electrode 1 will be eccentric in relation to the connection openings, that is a point of its circumference will be in contact with the edges 29 of the flanges 30. The sleeve or hollow shaft 8 is connected by means of suitable sleeves or conduit connecting pieces with another hollow shaft 18 which is journalled in a bearing 19 and provided at its projecting end with a bevel gear wheel 20. Both gear wheels 20 belonging to the two sets of electrodes 1 (Fig. 1) are in mesh with bevel gear wheels 21 on a common shaft 22 which is adapted to be intermittently rotated, for instance by means of a ratchet and pawl device, such as at 23.

The electrode 1 is hollow as stated above and to the same leads a piping 24 for a suitable cooling means, such as water, which is discharged from the hollow electrode through a passage 3 round about the piping 24 in the mandrel and thence through the hollow spindle 2 into the sleeve 65 and finally through holes in the said sleeve into a discharge trough 66 or the like, see Figs. 1 and 3. Other parts of the machine may naturally also be provided with similar cooling arrangements, if such are found to be desirable or necessary.

At least one of the two bearings or housings 5 may be moved towards or away from the other along guides 25, and further at least one of the two supporting slides 26 having upright supports 33 may be moved towards or away from the other along a guide 27 which is in front of and parallel with the guides 25. These guides 25 and 27 as well as other stationary parts of the machine are mounted in the usual way on a frame of which fractions are shown in Fig. 3. Intermediate the two slides 26 there is provided a table or the like 28 for supporting the body of the radiator section during welding.

The radiator sections are placed with one of their longitudinal outer edges on the table 28 and are pushed in lateral direction with their connection openings 6 over the centered electrodes 1, so that the edges 29 of the connection flanges 30 on the said openings are in register with the electrodes 1, as shown in Fig. 3. To each of the slides 26 are pivotally attached centering cheeks 31 and 32, and these cheeks are swung upwardly into the position as shown with dash-dotted lines in Fig. 2, in which position they grip around the flanges 30 and center the same with respect to the axis of the electrode roller 1, when this latter is in centered position with respect to the housing or bearing 5. The said centering cheeks 31 and 32 constitute at the same time outer counter electrodes to the inner electrode 1. The innermost radiator section 7, that is the section adjacent the housings or bearings 5 and which is to be welded on to the next to last section rests with its surfaces around the flanges 30 upon the upright supports 33 on the slides 26, to which are pivotally attached clamping forks or the like 34 (see the dotted lines in Fig. 3) which are swung about their pivots 41 to grip the outer surface of the next to last section, as shown with dash-dotted lines in Fig. 1, and to press this said section against the last section. The sections being centered and secured in this manner, the discs 17 (Figs. 1 and 3) are moved backwards, whereby the pin 15 through the influence of the spring 13 is moved radially outwardly, so that the spindle 2 will be rocked about the point of the screw 11 and thus receive an inclined position, so that the electrode 1 will have an eccentric position relatively to the connection openings 6, that is it will be in contact with the edges 29 of the flanges 30. As the spindles 2 together with the electrode rollers 1 thereon are connected by means of the gearings 20, 21 with the intermittently rotated driving shaft 22, the electrodes 1 roll step by step along the edges 29 in a concentric path. The welding current to effect the welding is in a manner known per se kept closed during the stand-still of the electrode rollers 1 and opened during the travel of the latter. In this manner the electrode rollers 1 are caused to travel at lest one revolution along their concentric paths in intimate contact with the edges 29 preferably bent inwards, and if desired or considered necessary the electrode rollers may be caused to travel two or more revolutions in order to obtain a complete and satisfactory welding of the edges of the flanges 30. When the welding is completed the clamping forks and the centering cheeks are swung back into their initial positions, as shown with full lines in Figs. 1 and 3, and the electrode rollers 1 are brought back into their centered position by displacing the discs 17 in a forward direction (to the left). In this position of the various parts all the sections on the supporting table 28 are entirely free to be moved forwards (to the left in Figs. 1 and 3) in order to be able to insert a further section from the side or from above in juxtaposition to the section which has last been welded on, and this fresh section may thereupon be centered and clamped to the last section and finally welded on to the latter, precisely as before.

It is to be understood that the movements necessary for closing and opening the centering cheeks and the clamping forks and for axially displacing the discs 17 and further, if desired, the movements to and fro of the radiator sections on the supporting table 28 may be effected totally or partly automatically. In such a case the said movements may be obtained from a single operating shaft which in its turn may be made manually or automatically operative and nonoperative respectively. According to the example shown in Fig. 2 there is a driving shaft 35 having fixed thereto a number of eccentrics or the like. The centering cheeks 31 and 32 are interconnected by means of gear wheels 36, 37 fixed to their axes of rotation. The gear wheel 36 has attached thereto an arm 38 which is connected by means of a rod 39 to an eccentric strap 40 of an eccentric fixed to the shaft 35. In a similar manner the shaft 41 carrying the clamping forks 34 is connected by means of bevel gear wheels 42 to an arm 43 which in its turn is connected by means of a rod 44 to an eccentric strap 45 of an eccentric fixed to the shaft 35. The disc 17 is displaced by means of a lever 46 which is connected by means of a rod 47 to an eccentric or the like (which however is not shown on the drawing) fixed to said shaft 35.

Figs. 5 and 6 disclose a modified form of the clamping device for the radiator sections, and this device may even be preferred instead of the above described form as shown in Figs. 1 and 3. According to the modification the clamping members 34$^a$ and 34$^b$ are arranged movable up and down respectively towards or away from the two radiator sections to be clamped together, and the centering cheeks 31$^a$ and 32$^a$ are reciprocably mounted within the clamping members and further, actuated by springs 70. The clamping members are attached to rods 71, 72 which are slideable in grooves in a guide plate or the like 73. The said rods 71 and 72 are provided with teeth which are in mesh with a gear wheel 75, and by turning the latter, the clamping members may be moved away from the section or pressed against the latter. By the last named movement at first the centering cheeks 31$^a$ and 32$^a$ are brought into contact with the flanges 30 and surround the same, whereupon the clamping members will come into action during which movement the springs 70 will be pressed together, thus ensuring good contact between the centering cheeks serving as electrodes and the said flanges 30.

In order to render the machine suitable for welding of radiator sections of various lengths the housings or bearings 5, the slides 26 and the bevel gear wheels 21 on the shaft 22 may be displaced.

The current used for the welding is preferably low tensioned alternating current having high intensity of current which is obtained by means of transformers of which the terminals of the secondary may be connected to the housings or bearings 5 on the one side and the slides 26 or the upright supports 33 thereon on the other side.

What I claim and desire to secure by Letters Patent is:—

1. A machine for electrically welding together metallic radiator sections having connection openings the peripheral edges of which are brought together for welding, comprising a rotatable spindle mounted to revolve eccentrically about an axis, and an electrode carried by said spindle adapted while rotating, to revolve within the connection openings in contact with the peripheral edges thereof.

2. A machine for electrically welding together metallic radiator sections having connection openings the peripheral edges of which are brought together for welding, comprising a rotatable spindle mounted to revolve concentrically about an axis, and an electrode carried by said spindle adapted while rotating to revolve within the connection openings in contact with the peripheral edges thereof, and a table to support the radiator sections, the latter being adapted to be moved laterally so that their connection openings may freely be passed over the electrode means.

3. In a machine for electrically welding together metallic radiator sections having connection openings the peripheral edges of which are brought together for welding, a bearing, a shaft rotatable therein, having a radial groove, a spindle rotatable with said shaft but nonrotatable relative thereto, said spindle being slidable radially within said groove, an electrode carried by said spindle, means for tiltably supporting the forward end of said spindle, means for resiliently retaining said spindle against said support and means for rocking said spindle about said support to cause said spindle to traverse a conic path of revolution.

4. In a machine for electrically welding together metal radiator sections having connection openings, the peripheral edges of which are brought together for welding, a bearing, a shaft rotatable therein having a radial groove, a spindle rotatable with said shaft but nonrotatable relative thereto, said spindle being slidable radially within said groove, an electrode carried by said spindle, means for causing said spindle to traverse a conic path of revolution with the end opposite the electrode toward the apex of said path, and means for adjustably varying the obliquity of said spindle with respect to its axis of revolution.

5. A machine for electrically welding together radiator sections of sheet iron and having connection openings surrounded by flanges, comprising a rotatable spindle, electrode means attached to the projecting end of said spindle being adapted to revolve eccentrically relative to said openings, a table to support the radiator sections which are adapted to be moved laterally so that their connection openings may freely be passed over the electrode means.

6. In a machine for electrically welding together radiator sections of sheet iron and having connection openings surrounded by flanges, a bearing, a shaft rotatably mounted therein, said shaft provided with a longitudinal groove a spindle, an electrode supported thereby, said spindle having two flat surfaces on opposite sides inserted in said groove, supporting means on the shaft to rockingly support the front end of the spindle, resilient means diametrically opposite the said supporting means, another resilient means at the other end of the spindle and arranged to react against the spindle in the same radial direction as the first named resilient means and adjustable supporting means diametrically opposite the last named resilient means.

7. In a machine for electrically welding together radiator sections of sheet iron, a spindle, electrode means supported thereby, said spindle being pivotally mounted at its front end in a rotatably mounted shaft, an adjustable supporting means at the other end of the spindle, a pivoted bell crank lever of which the one arm rests against the adjustable supporting means and the other arm rests against an axially displaceable disc, and a resilient means acting on the spindle diametrically opposite the adjustable supporting means.

8. In a machine for electrically welding together radiator sections of sheet iron and having connection openings surrounded by flanges, a slide having an upright supporting means to laterally support the radiator sections, centering members for the said flanges, movably mounted on the said slide and serving as outer electrodes, and an inner electrode adapted to roll along the internal joint of the flanges.

9. In a machine for electrically welding together radiator sections of sheet iron and having connection openings surrounded by flanges, a slide having an upright supporting means to laterally support the radiator sections and clamping means movably mounted on the slide and adapted to clamp the next to last section against the last section and against the upright supporting means.

10. In a machine for electrically welding together radiator sections of sheet iron and having connection openings surrounded by flanges, a slide, centering members movably mounted on the slide, clamping means movably mounted on the slide, an operative shaft, eccentric means mounted on said shaft and means between the centering members and the clamping means on the one side for connecting them to the eccentric means on the other side.

11. In a machine for electrically welding together radiator sections of sheet iron and having connection openings surrounded by flanges, reciprocable clamping means for clamping two radiator sections together, operative means to reciprocate said clamping means, centering means mounted within said clamping means and resilient supporting means for said centering means.

12. In a machine for electrically welding together radiator sections of sheet iron and having two sets of connection openings at either end, surrounded by flanges, two displaceable sets of rotatable inner electrodes, two displaceable slides each provided with movable clamping means and movable centering means, and operative means to simultaneously rotate both electrode sets.

In testimony whereof I have signed my name to this specification.

ANDERS JÖNSSON.